United States Patent [19]
Bernin

[11] 3,855,525
[45] Dec. 17, 1974

[54] ANGULAR VELOCITY SENSOR

[75] Inventor: Victor Maurice Bernin, Mount Prospect, Ill.

[73] Assignee: Illinois Tool Works Inc., Chicago, Ill.

[22] Filed: Oct. 5, 1973

[21] Appl. No.: 404,062

[52] U.S. Cl. ............... 324/34 D, 324/173, 340/195
[51] Int. Cl. ............................................. G01p 3/48
[58] Field of Search ........... 324/34 P, 34 GT, 34 D, 324/340 SC, 165, 172, 173, 174, 41, 179; 73/229, 230, 231 R; 340/271, 195, 196, 197, 199, 347 P; 360/122; 336/79

[56] References Cited
UNITED STATES PATENTS

| | | | |
|---|---|---|---|
| 2,765,459 | 10/1956 | Winter | 340/271 UX |
| 3,342,070 | 9/1967 | Walch | 324/174 X |
| 3,559,064 | 1/1971 | Grundy | 324/173 |
| 3,582,781 | 6/1971 | Uemura | 324/172 |
| 3,684,961 | 8/1972 | Muir | 340/199 X |

*Primary Examiner*—Michael J. Lynch

[57] ABSTRACT

A sensing device for sensing the speed of a rotating tone wheel which creates a varying magnetic field as it rotates is disclosed. One embodiment of the sensor comprises a closed-loop magnetic core having a slot in it to increase its sensitivity. A sense winding is excited with a high frequency carrier to provide the output signal. A second embodiment utilizes two closed-loop magnetic cores having one end of their sensing leads connected together, and the opposite ends connected to opposite phase excitation signals. In both embodiments, permanent magnets may be utilized if the tone wheel consists of nonmagnetized ferromagnetic material.

4 Claims, 6 Drawing Figures

PATENTED DEC 17 1974 3,855,525
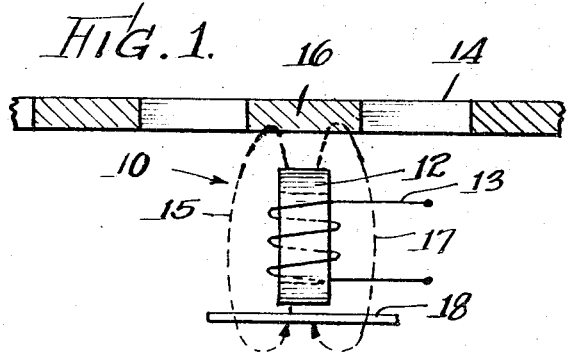
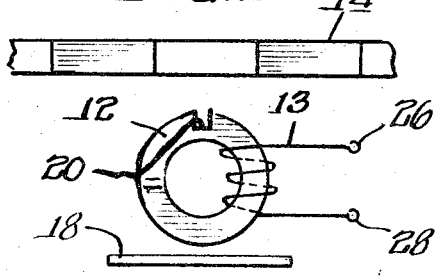
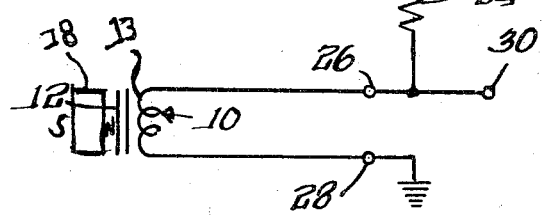
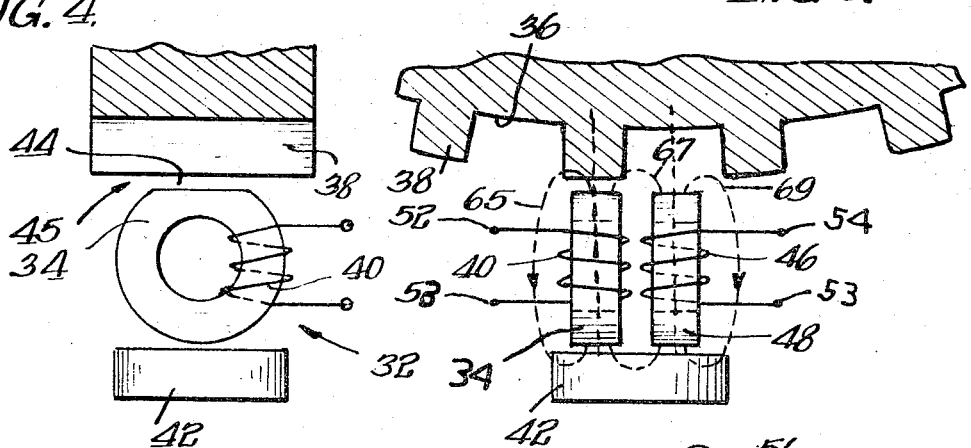
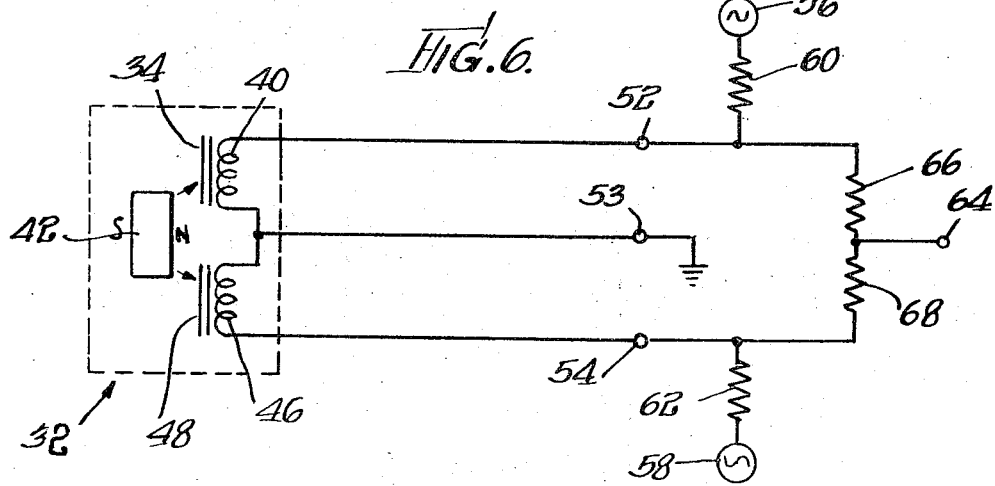

3,855,525

ANGULAR VELOCITY SENSOR

BACKGROUND OF THE INVENTION

Several types of sensing devices are known for detecting the motion of rotating bodies. One common type of such a detector requires a permanently magnetized tooth wheel or disc, or alternately a ferromagnetic wheel or disc that is in the vicinity of a permanent magnet. As the wheel or disc rotates, a varying magnetic flux is established adjacent its periphery. The variation in the magnetic field created by the rotating member has been detected by two different types of detectors.

Probably the most common type of detector that is employed generates a voltage that is a function of the speed of rotation of the rotating member. The rate sensitivity of this type of sensing device is a serious deficiency for many applications particularly automotive antiskid systems, for example. This is due to the fact that the output signal decreases with speed to such an extent that it places a lower speed limit on the antiskid system, which greatly decreases the practicality of such a system.

Another type of rotational speed sensor for sensing a magnetic field variation created by a rotating member is the type that relies on sensing the change of inductance that occurs in a magnetic core. One such type of device is shown in Favre Pat. No. 3,505,595.

In the Favre inductance sensing devices, a high frequency excitation voltage is supplied to a winding on an elongated core, and the change of the inductance is caused by the varying magnetic field created by the rotating member. However, with such a device, the sensitivity will be relatively low due to the open flux path of the core member.

In the sensing devices of the present invention, the change of inductance of the winding on the core may be sensed in the manner of the Favre patent, or by other suitable sensing means; and, therefore, the velocity dependency of the sensing device is minimized. In addition, the sensitivity of the devices of the present invention are greatly enhanced due to the employment of a closed-loop core member. Preferably the use of a pair of cores and its associated windings are interconnected so as to provide for differential sensing.

DESCRIPTION OF THE DRAWINGS

The present invention is illustrated by reference to the following drawings in which:

FIG. 1 is an end view of a single core embodiment of the present invention;

FIG. 2 is a side view of the single core embodiment of FIG. 1;

FIG. 3 is a schematic drawing illustrating the sensing system embodying the core of FIGS. 1 and 2;

FIG. 4 is a side view of a two-core embodiment of the present invention utilizing differential sensing;

FIG. 5 is an end view of the two-core embodiment of FIG. 4; and

FIG. 6 is a schematic illustration of the two-core embodiment of FIGS. 4 and 5.

TECHNICAL DESCRIPTION OF THE DRAWINGS

A single core sensing device for sensing the motion of a rotating wheel is indicated generally by the reference numeral 10 in FIG. 1. The rotating wheel 14 is preferably formed of a ferromagnetic material and it has teeth 16 on its inner periphery. The axis about which the wheel 14 rotates may be aligned so that the wheel 14 is as shown in FIG. 1, or alternately as shown in FIG. 5. The sensor 10 consists of a closed-loop magnetically saturable core 12, a sense winding 13, which is wound about one end of the core, and a high frequency A.C. generator 22. A permanent magnet 18 is positioned adjacent the core 12 to supply magnetic flux to the wheel 14 through the flux paths 15 and 17, which pass through the core 12. The magnet 18 is constructed according to conventional construction so that a magnetic pole of one polarity is adjacent the core 12, and so that the magnetic pole of the opposite polarity is positioned on the outer side of the magnet away from the magnetic core 12. A nonmagnetized wheel 14 is preferable because a wheel having magnetized teeth 16 would be more expensive. However, such a wheel could be employed, and in this event, it would not be necessary to utilize the permanent magnet 18.

The use of a closed-loop magnetic core in place of an elongated open-loop core greatly increases the sensitivity of a velocity sensor that relies on sensing the change of inductance of the sensing member. In order to further increase the sensitivity of the velocity sensor, it is desirable to provide a slot 20 in the core in order to reduce the cross-sectional area of the core whereby the flux density is increased in the narrowed cross-section. As a result, a given change in the external magnetic field will produce a greater change in the incremental permeability of the sensor and a corresponding greater change in the magnetic reluctance or inductance of the core.

The electrical circuit of the single core embodiment is shown in FIG. 3. One end 26 of the sense winding 13, which is wound about the core 12, is connected to the lower end of the resistor 24. The resistor 24 is coupled to the high frequency A.C. generator 22 so that excitation voltage is coupled through the resistor to the sensor 10. The other end 28 of the winding 13 is connected to ground. The output signal is taken at the terminal 30.

While the embodiment of FIG. 1 has a greatly increased sensitivity over similar sensing device which utilize open-loop magnetic cores, it is still primarily useful in applications in which a relatively large magnetic flux occurs in the air gap. The sensing device 32 of FIGS. 4 through 6 is, however, useful where the relative change in flux density is very small. In this sensor, two closed-loop magnetic cores 34 and 48 are employed. The rotating member or wheel 36 may have either magnetic teeth 38, or the entire wheel may be constructed of unmagnetized ferromagnetic material as previously described. In the event that the wheel has unmagnetized teeth, the magnet 42 must be utilized to provide the necessary magnetic field. The magnetic flux from the magnet 42 follows the air flux paths 65, 67 and 69 and passes through the cores 34 and 48. The cores 34 and 48 may have a flat upper surface 44 so as to minimize the air gap 45.

The magnetic cores 34 and 48 each have the sense winding 40 and 46 wound about them, respectively. One end of each of the windings 40 and 46 are connected together into the terminal 53, which is grounded. The other end of the winding 40 is connected to the terminal 52. The terminal 52 is connected to the resistors 60 and 66. The resistor 66 is coupled to the A.C. excitation generator 56, which supplies an excitation signal of a first phase to the winding 40. The second end of the winding 46 is connected to the terminal 54, which in turn has the resistors 62 and 68 connected to it. The resistor 62 is coupled to the A.C. excitation generator 58, which supplies an excitation signal to the winding 46 that is 180° out of phase with respect to the signal supplied by the generator 56. The resistors 66 and 68 are connected together and to the output terminal 64.

In the absence of the wheel 36, a balanced output signal will be provided across the terminals 53 and 64. When the magnetic flux changes due to the rotation of the wheel 36, the output signal from the sensor will have a phase reversal and will go through zero volts once per tooth cycle or interval. The cores 34 and 48 are spaced apart so that when the center of the core 34 is aligned with a tooth 38, the center of the core 48 will be approximately aligned with the center of the air gap between the tooth in alignment with the core 34 and the next adjacent tooth. The phase cross-over points of this signal may be detected by a phase detector.

The balanced differential sensing system of FIGS. 4 through 6 is best utilized with closed-loop core members. However, open-loop elongated core members may be employed in the described system; however, there will be an output decrease in sensitivity as a result. In addition, the sensitivity of the system may be improved by providing low magnetic reluctance flux paths for the flux paths 15 and 17 of FIG. 1 and the flux paths 65, 67 and 69 of FIG. 5. In addition to the direct coupling from the generators 56 and 58, which is shown in FIG. 6, the excitation signal may be supplied by a transformer coupling to the windings 40 and 46. This can be accomplished by the addition of primary windings on the cores 34 and 48 so that the windings 40 and 46 act as secondary windings of the transformer.

Other advantages and objectives of the present invention will be apparent from the present document to those skilled in the art

What is claimed is:

1. A velocity sensing device comprising a sensing means, a rotating member having teeth on its periphery which are capable of conducting magnetic flux to create a time-varying magnetic field with respect to said sensing means, said sensing means comprising a pair of magnetic cores positioned adjacent the periphery of said rotating member, a winding on each of said cores, excitation generator means coupled to supply a carrier signal of a first phase to one of said windings and a carrier signal of a second phase to the other of said windings, said second phase being 180° out of phase with respect to said first phase, and a pair of impedances which are not effected by said magnetic field connected together and to said windings to form a four-arm bridge circuit having a pair of output terminals at which a composite signal results due to said carrier signals and to the rotation of said member, the centerlines of said cores being spaced such that when the centerline of one core is aligned with the centerline of a tooth, the centerline of the other core is approximately aligned with the centerline of the space between said tooth and the next adjacent tooth.

2. A sensing device as claimed in claim 1 wherein said rotating member is an unmagnetized wheel of magnetic material and a permanent magnet is positioned adjacent said cores so that magnetic flux from said permanent magnet passes through said teeth and said magnetic cores and said magnetic cores are closed-loop torroidal shaped cores.

3. A velocity sensing device comprising sensing means, a rotating member having a plurality of projections on its periphery which are capable of conducting magnetic flux that creates a time-varying magnetic field with respect to said sensing means, said sensing means comprising a pair of magnetic cores positioned adjacent the periphery of said rotating member, a winding on each of said cores, excitation generator means coupled to supply a carrier signal of a first phase to one of said windings and a carrier signal of a second phase to the other of said windings, said second phase being 180° out of phase with respect to said first phase, and a pair of impedances which are not effected by said magnetic field connected together and to said windings to form a four-arm bridge circuit having a pair of output terminals at which a composite signal results due to said carrier signals and to the motion of said member, said cores being spaced such that when the centerline of one core is aligned with the centerline of a projection, the centerline of the other core is approximately aligned with the centerline of the space between said projection and the next adjacent projection.

4. A sensing device as claimed in claim 3 wherein said member is an unmagnetized member of magnetic material and a permanent magnet is positioned adjacent said cores so that magnetic flux from said permanent magnet passes through said projections and said magnetic cores and said magnetic cores are closed-loop torroidal shaped cores.

* * * * *